(12) United States Patent
Hunt et al.

(10) Patent No.: US 11,337,371 B2
(45) Date of Patent: May 24, 2022

(54) SYSTEMS AND METHODS FOR LIMITING REEL ADJUSTMENT IN AN AGRICULTURAL HEADER

(71) Applicant: CNH Industrial America LLC, New Holland, PA (US)

(72) Inventors: Cory Douglas Hunt, Millersville, PA (US); Jethro Martin, Ephrata, PA (US); Nicholas Shane, Bennett, IA (US)

(73) Assignee: CNH Industrial America LLC, New Holland, PA (US)

( * ) Notice: Subject to any disclaimer, the term of this patent is extended or adjusted under 35 U.S.C. 154(b) by 319 days.

(21) Appl. No.: 16/724,837

(22) Filed: Dec. 23, 2019

(65) Prior Publication Data

US 2021/0185877 A1 Jun. 24, 2021

(51) Int. Cl.
| | |
|---|---|
| *A01D 41/14* | (2006.01) |
| *A01D 57/04* | (2006.01) |
| *A01B 63/00* | (2006.01) |
| *A01D 75/00* | (2006.01) |

(52) U.S. Cl.
CPC .......... *A01D 57/04* (2013.01); *A01B 63/002* (2013.01); *A01D 41/141* (2013.01); *A01D 75/00* (2013.01)

(58) Field of Classification Search
CPC ...... A01D 57/04; A01D 57/02; A01D 34/006; A01D 41/141
See application file for complete search history.

(56) References Cited

U.S. PATENT DOCUMENTS

| | | | | |
|---|---|---|---|---|
| 4,124,970 A | * | 11/1978 | Bernhardt | ............ A01D 41/141 56/10.2 E |
| 4,204,383 A | * | 5/1980 | Milliken, Jr. | ........ A01D 41/141 56/10.2 E |
| 5,752,372 A | * | 5/1998 | Buermann | ............. A01D 57/04 56/10.2 E |
| 6,775,966 B2 | | 8/2004 | Frego | |
| 7,426,817 B2 | * | 9/2008 | Goers | .................. A01D 61/002 56/14.4 |

(Continued)

FOREIGN PATENT DOCUMENTS

| | | |
|---|---|---|
| CA | 2307176 A1 | 10/2001 |
| EP | 2055173 A1 | 5/2009 |

(Continued)

OTHER PUBLICATIONS

Grain Belt Plus Owner's Manual, Honey Bee Manufacturing Ltd., Mar. 25, 2010, 180 pages, Revision 3.0—2010.

(Continued)

*Primary Examiner* — Adam J Behrens
(74) *Attorney, Agent, or Firm* — Peter Zacharias; Patrick Sheldrake

(57) ABSTRACT

An agricultural system includes a frame, a cutter bar assembly configured to move relative to the frame during an operation of the agricultural system, a reel assembly configured to guide crops to the cutter bar assembly during the operation of the agricultural system, and a controller. The controller is configured to receive feedback indicative of a profile of the cutter bar assembly, set a position boundary of the reel assembly based on the feedback, and block movement of the reel assembly to a position beyond the position boundary of the reel assembly.

20 Claims, 9 Drawing Sheets

(56) References Cited

U.S. PATENT DOCUMENTS

| | | | |
|---|---|---|---|
| 7,805,921 B2* | 10/2010 | Goers | A01D 41/141 56/364 |
| 9,763,385 B2* | 9/2017 | Digman | A01D 41/141 |
| 10,034,428 B2* | 7/2018 | Cook | A01D 57/04 |
| 2009/0107094 A1* | 4/2009 | Bich | A01D 41/141 56/10.2 E |
| 2015/0216123 A1* | 8/2015 | Digman | A01D 41/141 56/10.2 R |
| 2018/0035607 A1 | 2/2018 | Favoretto | |
| 2018/0092305 A1* | 4/2018 | Cook | A01D 57/04 |
| 2019/0082603 A1* | 3/2019 | Farley | A01D 57/04 |
| 2019/0124842 A1 | 5/2019 | Ricketts et al. | |
| 2021/0105944 A1 | 4/2021 | Sudhues et al. | |

FOREIGN PATENT DOCUMENTS

| | | |
|---|---|---|
| EP | 2143318 A1 | 1/2010 |
| JP | 11155340 A | 6/1999 |
| JP | 2018088858 A | 6/2018 |

OTHER PUBLICATIONS

International Search Report and Written Opinion for Application No. PCT/US2020/063905 dated Mar. 12, 2021 (24 pages).

* cited by examiner

SYSTEMS AND METHODS FOR LIMITING REEL ADJUSTMENT IN AN AGRICULTURAL HEADER

BACKGROUND

The present disclosure generally relates to a header for an agricultural system.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A harvester may be used to harvest crops, such as barley, beans, beets, carrots, corn, cotton, flax, oats, potatoes, rye, soybeans, wheat, or other plant crops. During operation of the harvester, the harvesting process may begin by removing a portion of a plant from a field using a header of the harvester. The header may cut the plant and transport the cut crops to a processing system of the harvester. Certain headers include a cutter bar assembly configured to cut a portion of each crop (e.g., a stalk), thereby separating the cut crop from the soil. The cutter bar assembly may extend along a substantial portion of the width of the header at a forward end of the header. The header may also include one or more belts positioned behind the cutter bar assembly relative to the direction of travel of the harvester. The belt(s) are configured to transport the cut crops to an inlet of the processing system.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In certain embodiments, an agricultural system includes a frame, a cutter bar assembly configured to move relative to the frame during an operation of the agricultural system, a reel assembly configured to guide crops to the cutter bar assembly during the operation of the agricultural system, and a controller. The controller is configured to receive feedback indicative of a profile of the cutter bar assembly, set a position boundary of the reel assembly based on the feedback, and block movement of the reel assembly to a position beyond the position boundary of the reel assembly.

DRAWINGS

These and other features, aspects, and advantages of the present disclosure will become better understood when the following detailed description is read with reference to the accompanying drawings in which like characters represent like parts throughout the drawings, wherein.

Figure 1:
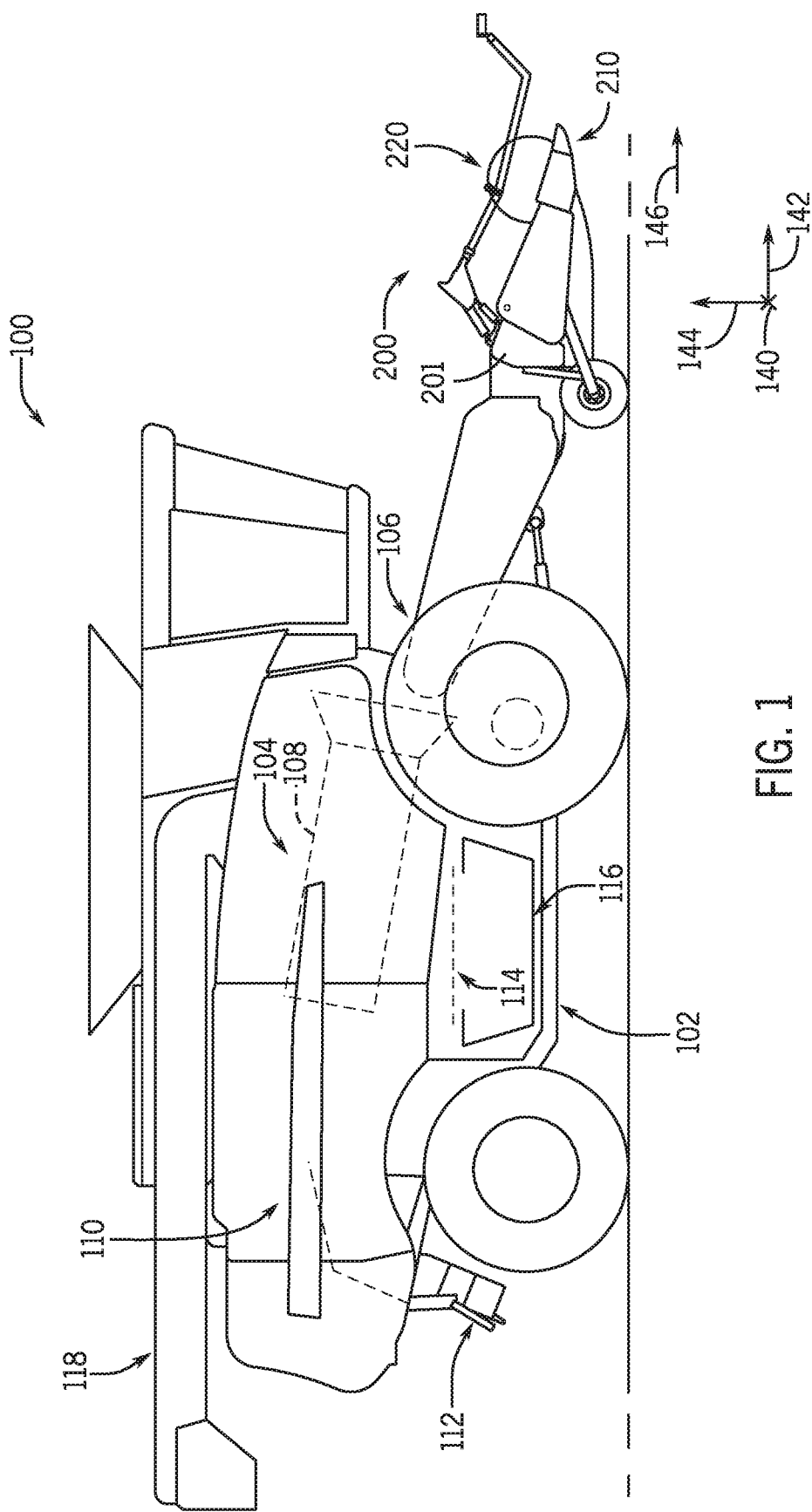
FIG. 1 is a side view of an embodiment of an agricultural system, in accordance with an aspect of the present disclosure.
Figure 8:
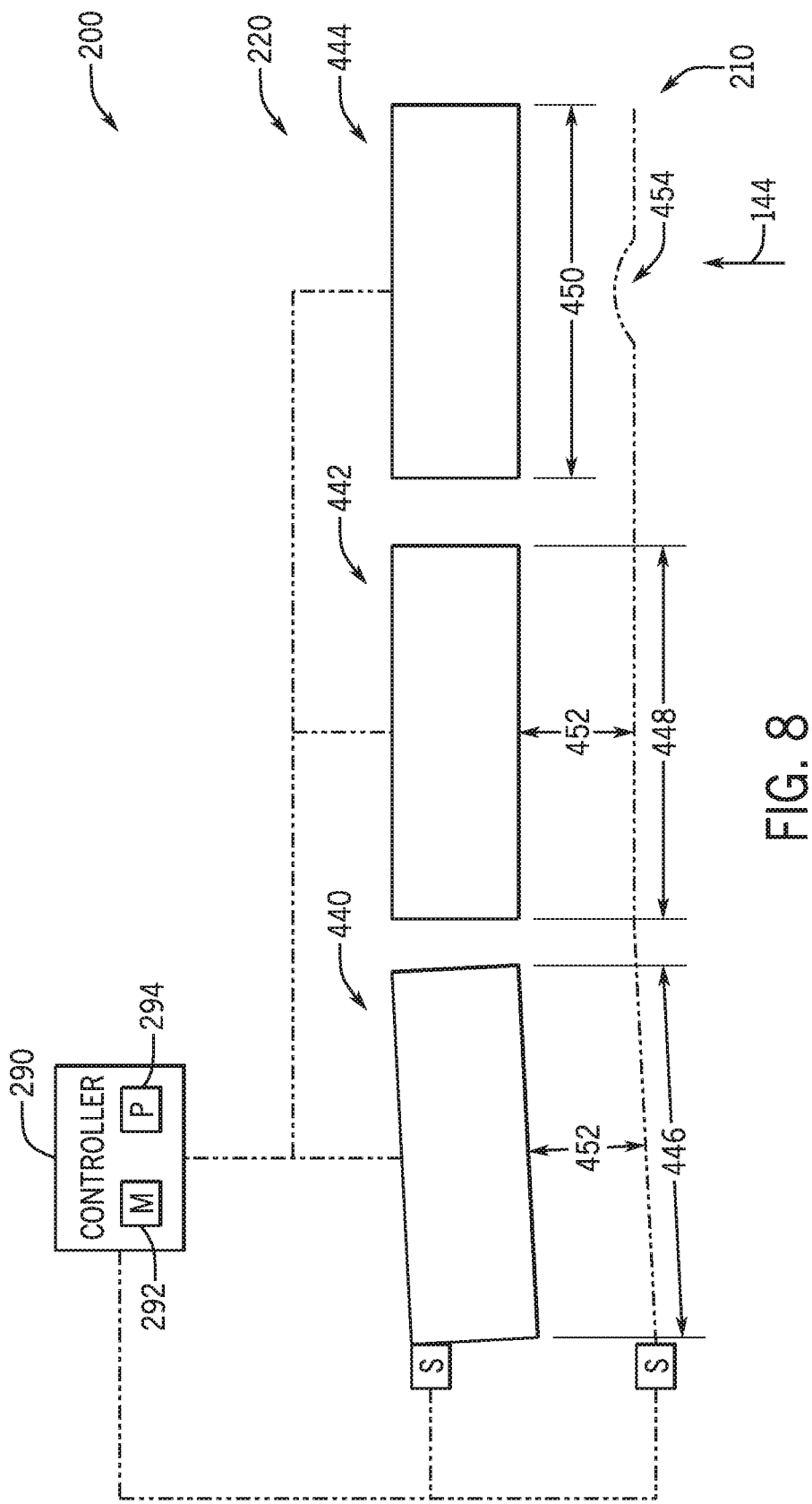
Figure 9:
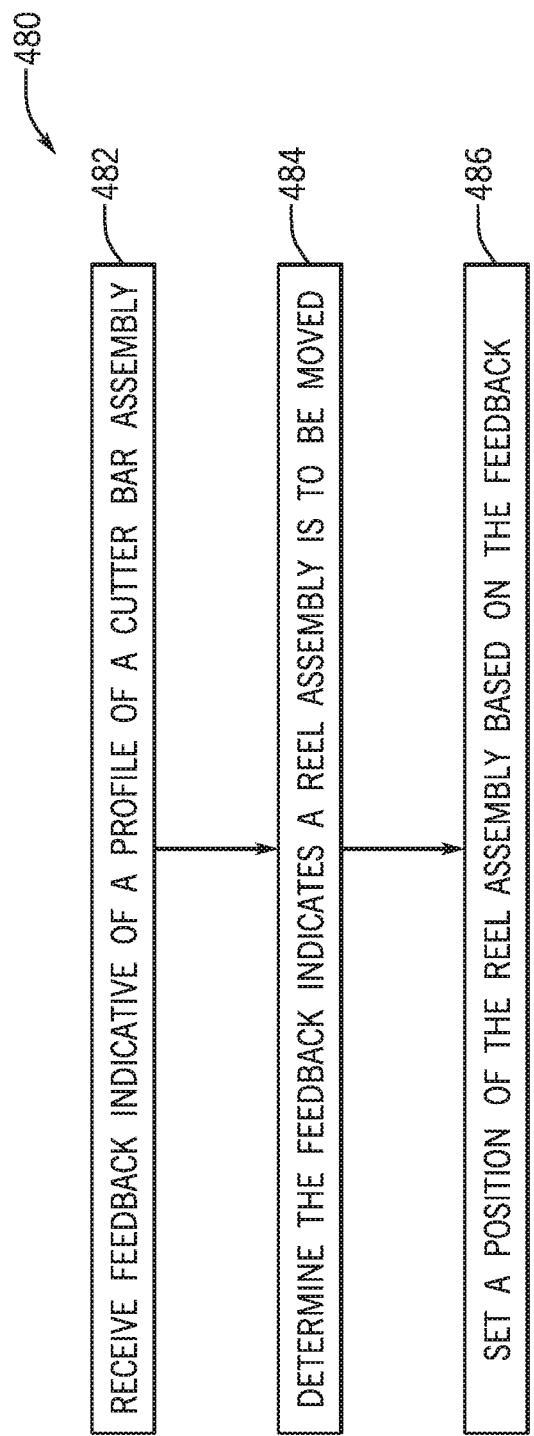

FIG. 8 is a schematic diagram of an embodiment of a header that may be employed within the agricultural system of FIG. 1, wherein the header includes a reel assembly having multiple sections, in accordance with an aspect of the present disclosure; and FIG. 9 is a flowchart of an embodiment of a method for setting a position of a particular section of the reel assembly of FIG. 8, in accordance with an aspect of the present disclosure.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The process of farming typically begins with planting seeds within a field. Over time, the seeds grow and eventually become harvestable crops. Typically, only a portion of each crop is commercially valuable, so each crop is harvested to separate the usable material from the remainder of the crop. For example, a harvester may cut crops within a field via a header, which may include a flexible draper header. The flexible draper header may include a cutter bar assembly configured to cut the crops. As the cutter bar assembly cuts the crops, a conveyor coupled to draper deck(s) of the header move the crops toward a crop processing system of the harvester. For example, the conveyor on the side draper deck(s) may move the cut crops toward an infeed draper deck at a center of the header. A conveyor on the infeed draper deck may then move the crops toward the crop processing system. The crop processing system may include a threshing machine configured to thresh the crops, thereby separating the crops into certain desired agricultural materials, such as grain, and material other than grain (MOG). The desired agricultural materials may be sifted and then accumulated into a tank. When the tank fills to capacity, the materials may be collected from the tank. The MOG may be discarded from the harvester (e.g., via a spreader) by passing through an exit pipe or a spreader to fall down onto the field.

In some embodiments, portions of the cutter bar assembly may move so as to follow a contour of the field. For example, the cutter bar assembly may be flexible to remain in contact with the field during operations. Furthermore, the header of the harvester includes a reel assembly configured to prepare crops to be cut by the cutter bar assembly. As an example, the reel assembly may be positioned adjacent to the cutter bar assembly and may be configured to guide the crops toward the cutter bar assembly to facilitate cutting the crops. In certain embodiments, the position of the reel assembly is adjustable relative to the cutter bar assembly so as to enable the reel assembly to effectively guide the crops toward the cutter bar assembly. However, in some circumstances, the cutter bar assembly and the reel assembly may interfere with one another. For instance, the cutter bar assembly may contact part of the reel assembly, thereby limiting an effectiveness of the cutter bar assembly, the reel assembly, and the header.

Thus, it is now recognized that setting a position of the reel assembly to avoid contact with the cutter bar assembly may improve operation of the header. Therefore, the present disclosure is directed to enabling or blocking movement of at least part of the reel assembly to avoid contact with the cutter bar assembly. For instance, movement of the cutter bar assembly (e.g., relative to the reel assembly) may be monitored during the operation of the harvester. In some embodiments, a user, such as an operator, of the harvester may adjust the position of the reel assembly relative to the cutter bar assembly during the operation. However, based on the monitored movement of the cutter bar assembly, adjustment of the reel assembly to a particular position may be blocked. For instance, the reel assembly may be blocked from being moved too close to the cutter bar assembly. In additional or alternative embodiments, the reel assembly may have multiple sections along a width of the header. Each section of the reel assembly may be moved independently of one another. For this reason, the reel assembly sections may be moved to different positions relative to the cutter bar assembly, such as based on movement of the cutter bar assembly at a particular location along the width of the header. As such, the reel assembly sections may be set in a particular profile that facilitates guiding crops at various locations along the header to be engaged by the cutter bar assembly.

With the foregoing in mind, FIG. 1 is a side view of an embodiment of an agricultural system 100, which may be a harvester. The agricultural system 100 includes a chassis 102 configured to support a header 200 and an agricultural crop processing system 104. As described in greater detail below, the header 200 is configured to cut crops and to transport the cut crops toward an inlet 106 of the agricultural crop processing system 104 for further processing of the cut crops. The agricultural crop processing system 104 receives the cut crops from the header 200 and separates desired crop material from crop residue. For example, the agricultural crop processing system 104 may include a thresher 108 having a cylindrical threshing rotor that transports the crops in a helical flow path through the agricultural system 100. In addition to transporting the crops, the thresher 108 may separate certain desired crop material (e.g., grain) from the crop residue, such as husks and pods, and may enable the desired crop material to flow into a cleaning system 114 (such as sieves) located beneath the thresher 108. The cleaning system 114 may remove debris from the desired crop material and transport the desired crop material to a storage tank 116 within the agricultural system 100. When the storage tank 116 is full, a tractor with a trailer on the back may pull alongside the agricultural system 100. The desired crop material collected in the storage tank 116 may be carried up by an elevator and dumped out of an unloader 118 into the trailer. The crop residue may be transported from the thresher 108 to a crop residue handling system 110, which may process (e.g., chop/shred) and remove the crop residue from the agricultural system 100 via a crop residue spreading system 112 positioned at an aft end of the agricultural system 100. To facilitate discussion, the agricultural system 100 and/or its components may be described with reference to a lateral axis or direction 140, a longitudinal axis or direction 142, and a vertical axis or direction 144. The agricultural system 100 and/or its components may also be described with reference to a direction of travel 146.

As discussed in detail below, the header 200 includes a cutter bar assembly 210 configured to cut the crops within the field. The header 200 also includes a reel assembly 220 configured to engage the crops to prepare the crops to be cut by the cutter bar assembly 210 and/or to urge crops cut by the cutter bar assembly 210 onto a conveyor system that directs the cut crops toward the inlet 106 of the agricultural crop processing system 104. The reel assembly 220 includes a reel having multiple fingers extending from a central framework. The central framework is driven to rotate such that the fingers engage the crops and urge the crops toward the cutter bar assembly 210 and the conveyor system. Additionally, the reel may be supported by multiple arms (e.g., reel arms) that are coupled to a frame 201 of the header 200. Each of the arms may be coupled to the frame 201 via a respective pivot joint. For example, one pivot joint is configured to enable a first arm of the multiple arms to pivot (e.g., about the lateral axis 140) relative to the frame 201, and another pivot joint is configured to enable a second arm of the multiple arms to pivot (e.g., about the lateral axis 140) relative to the frame 201.

Figure 2:
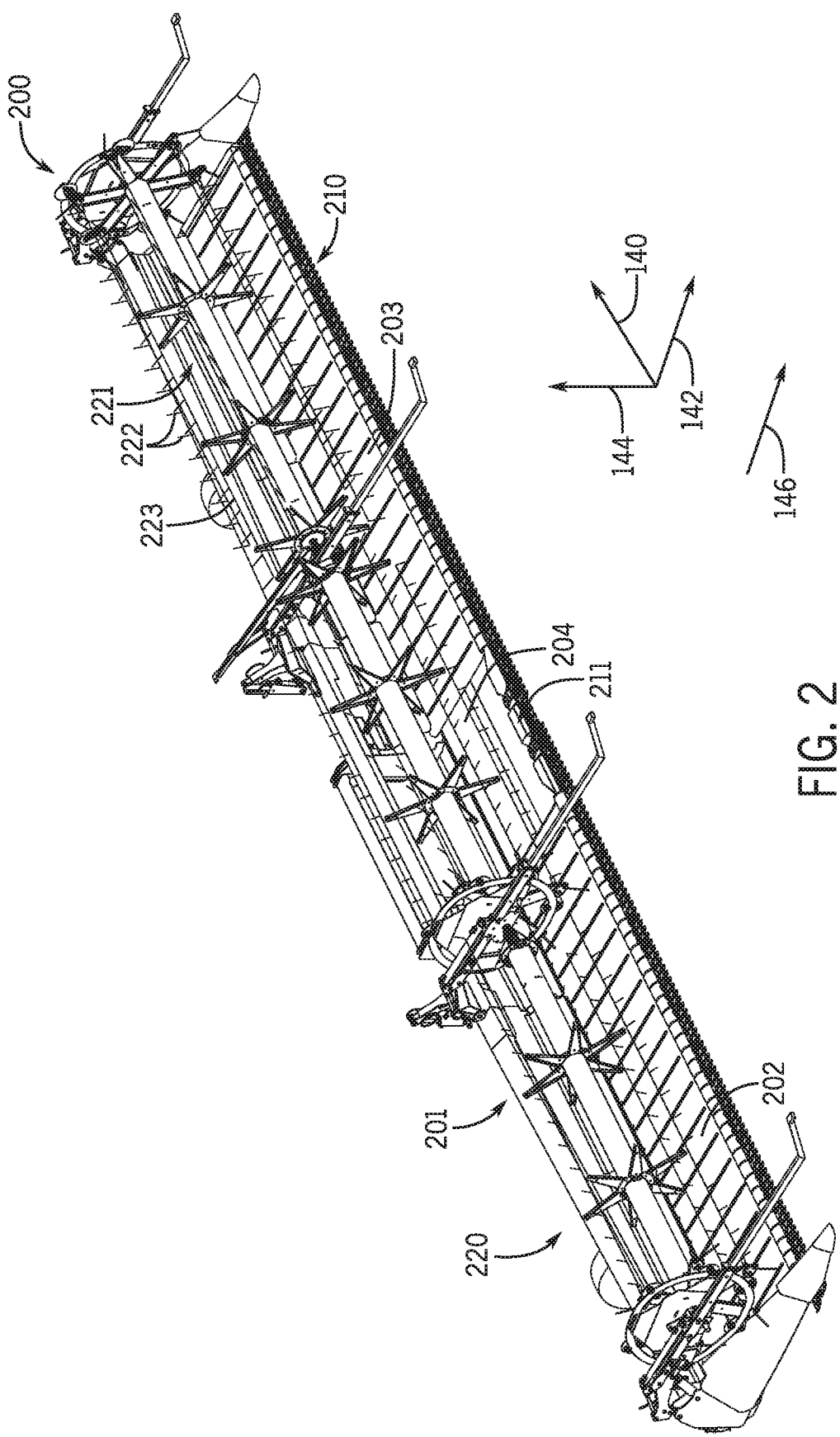
FIG. 2 is a perspective view of an embodiment of a header that may be employed within the agricultural system of FIG. 1, in accordance with an aspect of the present disclosure.

FIG. 2 is a perspective view of an embodiment of the header 200 that may be employed within the agricultural system 100 of FIG. 1. In the illustrated embodiment, the header 200 includes the cutter bar assembly 210 configured to cut a portion of each crop (e.g., a stalk), thereby separating the crop from the soil. The cutter bar assembly 210 is positioned at a forward end of the header 200 relative to the longitudinal axis 142 of the header 200. As illustrated, the cutter bar assembly 210 extends along a substantial portion of the width of the header 200 (e.g., along the lateral axis 140). The cutter bar assembly 210 includes a blade support, a stationary guard assembly, and a moving blade assembly. The moving blade assembly is fixed to the blade support (e.g., above the blade support along the vertical axis 144 of the header 200), and the blade support/moving blade assembly is driven to oscillate relative to the stationary guard assembly. In the illustrated embodiment, the blade support/moving blade assembly is driven to oscillate by a driving mechanism 211 positioned at a center of the header 200. However, in other embodiments, the blade support/moving blade assembly may be driven by another suitable mechanism (e.g., located at any suitable position on the header 200). As the agricultural system 100 is driven through the field, the cutter bar assembly 210 engages crops within the field, and the moving blade assembly cuts the crops (e.g., the stalks of the crops) in response to engagement of the cutter bar assembly 210 with the crops.

In the illustrated embodiment, the header 200 includes a first conveyor section 202 on a first lateral side of the header 200 and a second conveyor section 203 on a second lateral side of the header 200 opposite the first lateral side. The conveyor sections 202, 203 may be separate from one another. For instance, the first conveyor section 202 may extend along a portion of a width of the header 200 and the second conveyor section 203 may extend along another portion of the width of the header 200. Each conveyor section 202, 203 is driven to rotate by a suitable drive mechanism, such as an electric motor or a hydraulic motor. The first conveyor section 202 and the second conveyor section 203 are driven such that a top surface of each conveyor section 202, 203 moves laterally inward to a center conveyor section 204 positioned between the first conveyor section 202 and the second conveyor section 203 along the lateral axis 140. The center conveyor section 204 may also be driven to rotate by a suitable drive mechanism, such as an electric motor or a hydraulic motor. The center conveyor section 204 is driven such that the top surface of the center conveyor section 204 moves rearwardly relative to the direction of travel 146 toward the inlet. As a result, the conveyor sections 202, 203, 204 transport the cut crops through the inlet to the agricultural crop processing system for further processing of the cut crops. Although the illustrated header 200 includes two conveyor sections 202, 203 configured to direct crops toward the center conveyor section 204, there may be any suitable number of conveyor sections in additional or alternative embodiments directing the crops toward the center conveyor section.

In the illustrated embodiment, the crops cut by the cutter bar assembly 210 are directed toward the conveyor sections 202, 203 at least in part by the reel assembly 220, thereby substantially reducing the possibility of the cut crops falling onto the surface of the field. The reel assembly 220 includes a reel 221 having multiple fingers or tines 222 extending from a central framework 223. The central framework 223 is driven to rotate such that the fingers 222 move (e.g., in a circular pattern). The fingers 222 are configured to engage the crops and urge the cut crops toward the conveyor sections 202, 203 to facilitate transportation of the cut crops to the agricultural crop processing system.

As illustrated herein, the cutter bar assembly 210 is flexible along the width of the header 200. As discussed in detail below, the cutter bar assembly 210 is supported by multiple arm assemblies distributed along the width of the header 200. In some embodiments, the frame 201 of the header 200 may be movably coupled to the chassis of the agricultural system. Each arm assembly is mounted to the frame 201 and includes an arm coupled to the cutter bar assembly 210. The arm may rotate and/or move the cutter bar assembly 210 along the vertical axis 144 relative to the frame 201, thereby enabling the cutter bar assembly 210 to flex during operation of the agricultural system. Thus, the cutter bar assembly 210 may follow the contours of the field, thereby enabling the cutting height (e.g., the height at which each crop is cut) to be substantially constant along the width of the header 200.

Figure 3:
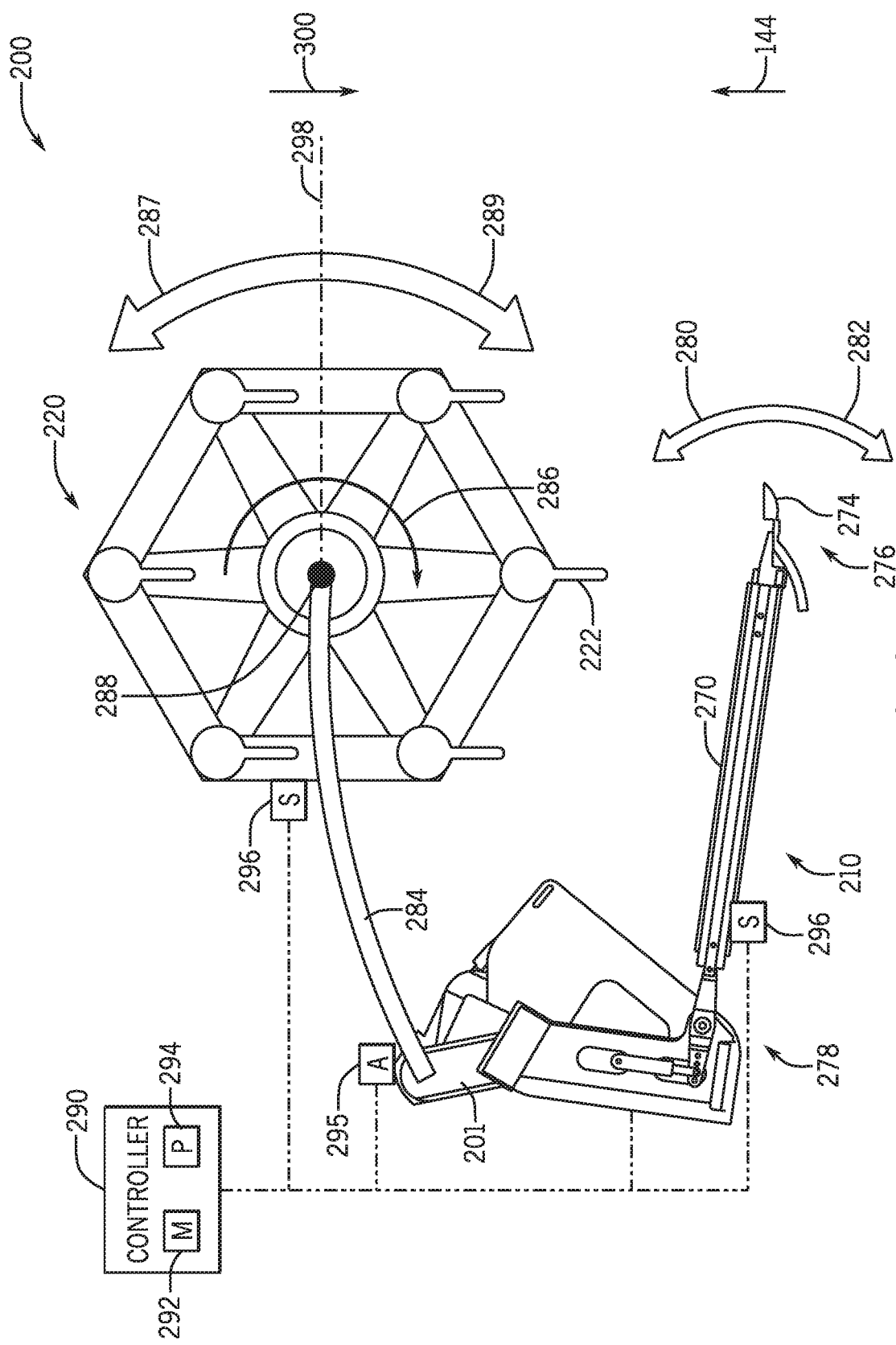
FIG. 3 is a cross-sectional side view of a portion of the header of FIG. 2, in accordance with an aspect of the present disclosure.

FIG. 3 is a cross-sectional side view of an embodiment portion of the header 200 having the reel assembly 220 and the cutter bar assembly 210. The illustrated cutter bar assembly 210 includes arms 270 supporting blades 274 at a first end 276 of the arms 270. Further, the arms 270 may be coupled to the frame 201 of the header 200 at a second end 278 of the arms 270. As an example, the arms 270 may be pivotably coupled to the frame 201 at the second end 278. In this manner, the arms 270 may be configured to rotate relative to the frame 201. As such, the arms 270 may rotate in a first rotational direction 280, which may raise the arms 270 along the vertical axis 144, and the arms 270 may rotate in a second rotational direction 282, which may lower the arms 270 along the vertical axis 144. In certain embodiments, the arms 270 may freely rotate in the rotational directions 280, 282 to follow a contour of the field on which the header 200 is harvesting. For example, the arms 270 may position the blades 274 to maintain contact with the field. As such, an upward slope of the field may push the arms 270 to rotate in the first rotational direction 280 to raise the blades 274 relative to the frame 201 and therefore avoid inserting the blades 274 into the field. Moreover, at a downward slope of the field, the weight of the blades 274 may cause the arms 270 to rotate in the second rotational direction 282 to lower the blades 274 relative to the frame 201 such that the blades 274 remain in contact with the field. In additional or alternative embodiments, the entire cutter bar assembly may translate along the vertical axis. That is, in addition to or as an alternative to rotating about the frame, the cutter bar assembly may slide along the frame. Indeed, the cutter bar assembly 210 may be configured to move in any suitable manner to enable the blades 274 to maintain contact with the field as the header travels through the field.

The reel assembly 220 may also move relative to the frame 201 and relative to the cutter bar assembly 210. In the illustrated embodiment, the frame 201 includes an extension 284 (e.g., a reel arm) coupling the reel assembly 220 to the frame 201. The extension 284 may position the reel assembly 220 above the cutter bar assembly 210 along the vertical axis 144 such that the reel assembly 220 may urge the cut crops toward the blades 274. For instance, the reel assembly 220 may rotate in a third rotational direction 286 about a pivot point 288 to which the extension 284 is coupled. By rotating in the third rotational direction 286, the fingers 222 may guide the crops toward the blades 274 that cut the crops. The extension 284 may also move relative to the frame 201 to move the reel assembly 220 relative to the frame 201 and relative to the cutter bar assembly 210. As an example, the extension 284 may rotate about the frame 201 and may be configured to raise the reel assembly 220 in a first (e.g., upward) direction 287 relative to the vertical axis 144 and/or in a second (e.g., downward) direction 289 relative to the vertical axis 144. In this way, the extension 284 may be positioned desirably relative to the cutter bar assembly 210 to enable the reel assembly 220 to guide the crops to be cut by the cutter bar assembly 210. In an example, the reel assembly 220 may be positioned proximate to the cutter bar assembly 210 without the fingers 222 interfering (e.g., contacting) with the blades 274.

In the illustrated embodiment, the header 200 includes a controller 290 configured to control operating parameters of the agricultural system, such as of the header 200. The controller 290 may include a memory 292 and a processor 294 (e.g., a microprocessor). The controller 290 may also include one or more storage devices and/or other suitable components. The processor 294 may be used to execute software, such as software for controlling the agricultural system and/or the header 200. Moreover, the processor 294 may include multiple microprocessors, one or more "general-purpose" microprocessors, one or more special-purpose microprocessors, and/or one or more application specific integrated circuits (ASICS), or some combination thereof. For example, the processor 294 may include one or more reduced instruction set (RISC) or complex instruction set (CISC) processors. The memory 292 may include a volatile memory, such as random access memory (RAM), and/or a nonvolatile memory, such as read-only memory (ROM). The memory 292 may store a variety of information and may be used for various purposes. For example, the memory 292 may store processor-executable instructions (e.g., firmware or software) for the processor 294 to execute, such as instructions for controlling the agricultural system and/or the header 200. The memory 292 and/or the processor 294, or an additional memory and/or processor, may be located in any suitable portion of the agricultural system. By way of example, the controller 290 may be located in a cab of the agricultural system and/or on the header 200.

The controller 290 may be configured to output control signals for controlling the header 200 based on sensor feedback. For instance, the controller 290 may be communicatively coupled to an actuator 295, which may be configured to move the extension 284 relative to the frame 201 to move the reel assembly 220 relative to the frame 201 and relative to the cutter bar assembly 210. The controller 290 may therefore output control signals to instruct the actuator 295 to set a position of the extension 284, thereby setting a position of the reel assembly 220 accordingly.

As an example, the illustrated header 200 includes sensors 296 that may be disposed on the cutter bar assembly 210 and/or on the reel assembly 220. The sensors 296 may be configured to detect the respective positions (e.g., a rotational position about the frame 201) of the cutter bar assembly 210 and of the reel assembly 220. Thus, the controller 290 may receive the sensor feedback for determining the position of the cutter bar assembly 210 relative to the reel assembly 220. Additionally or alternatively, the sensors may be configured to detect other operating parameters of the agricultural system, such as a condition (e.g., a contour) of the field, a height of the crops and/or of the field (e.g., in front of the agricultural system), a traveling speed of the agricultural system, a rotational velocity of the arms of the cutter bar assembly, and the like. In any case, the controller 290 may be configured to operate the header 200 based on the received sensor feedback, such as to instruct the actuator 295 to adjust a position of the reel assembly 220 relative to the frame 201 and/or relative to the cutter bar assembly 210 based on the detected respective positions of the cutter bar assembly 210 and of the reel assembly 220. As used herein, the position of the reel assembly 220 may refer to a position of the pivot point 288 relative to the frame 201 and/or relative to the cutter bar assembly 210.

Furthermore, a user may utilize the controller 290 for manually controlling the cutter bar assembly 210 and/or the reel assembly 220. For instance, the controller 290 may include or be communicatively coupled to a user interface, which may be used by the user to provide user inputs to manually position the cutter bar assembly 210 and/or the reel assembly 200, for example. In this manner, the controller 290 may enable the user to adjust the reel assembly 220 to a desired position, such as based on the type of crops being harvested by the header 200, the contour of the field on which the header 200 harvests, and so forth.

In some circumstances, the user may transmit a user input (e.g., via the controller 290) to move the reel assembly 220 to a position in which the reel assembly 220 may contact the cutter bar assembly 210, such as to a position that is too close to the cutter bar assembly 220, thereby affecting an operation of the cutter bar assembly 210 to cut the crops. For this reason, the controller 290 may be configured to block the reel assembly 220 from being positioned too close to the cutter bar assembly 210. To this end, the controller 290 may establish a position boundary (e.g., a lower position boundary and/or an upper position boundary). The controller 290 may enable movement within the position boundary but may block the reel assembly 220 from being moved beyond the position boundary. For example, the position boundary may include an upper position boundary (not shown), which may be a position where the reel assembly 220 may be moved farthest away from the cutter bar assembly 210. The upper position boundary may be based on a mechanically allowable movement of the extension 284 about the frame 201. For instance, the upper position boundary may be based on a strength of the extension 284, a rotational range of the extension 284, a weight of the reel assembly 220, another suitable parameter, or any combination thereof. The position boundary may also include a lower position boundary 298, which may be a position where the reel assembly 220 may be moved closest to the cutter bar assembly 210. The lower position boundary 298 may be based on the mechanically allowable movement of the extension 284 about the frame 201 and also on the position of the cutter bar assembly 210. In the illustrated embodiment, the position of the reel assembly 220 is at the lower position boundary 298. As such, the reel assembly 220 may be blocked from moving farther in a direction 300 (e.g., a downward direction) along the vertical axis 144 to move beyond the lower position boundary 298. In this way, a likelihood of the reel assembly 220 contacting the cutter bar assembly 210 is limited. Indeed, in embodiments in which the reel assembly 220 may have multiple sections, a separate position boundary may be set for each respective section of the reel assembly 220 based on movement of the cutter bar assembly 210 associated with the respective sections of the reel assembly.

In certain embodiments, the lower position boundary 298 may be based on movement of the cutter bar assembly 210 during the operation of the header 200. For instance, the controller 290 may establish the lower position boundary 298 based on previously recorded data associated with the position of the cutter bar assembly 210 (e.g., from the sensors 296). As such, the controller 290 may dynamically move the lower position boundary 298 (e.g., relative to the frame 201 and/or the cutter bar assembly 210), such as based on a change in the contour of the field. Additionally or alternatively, the controller may establish the lower position boundary based on other data, such as user input data, predictive data, and/or any other suitable data.

Figure 4:
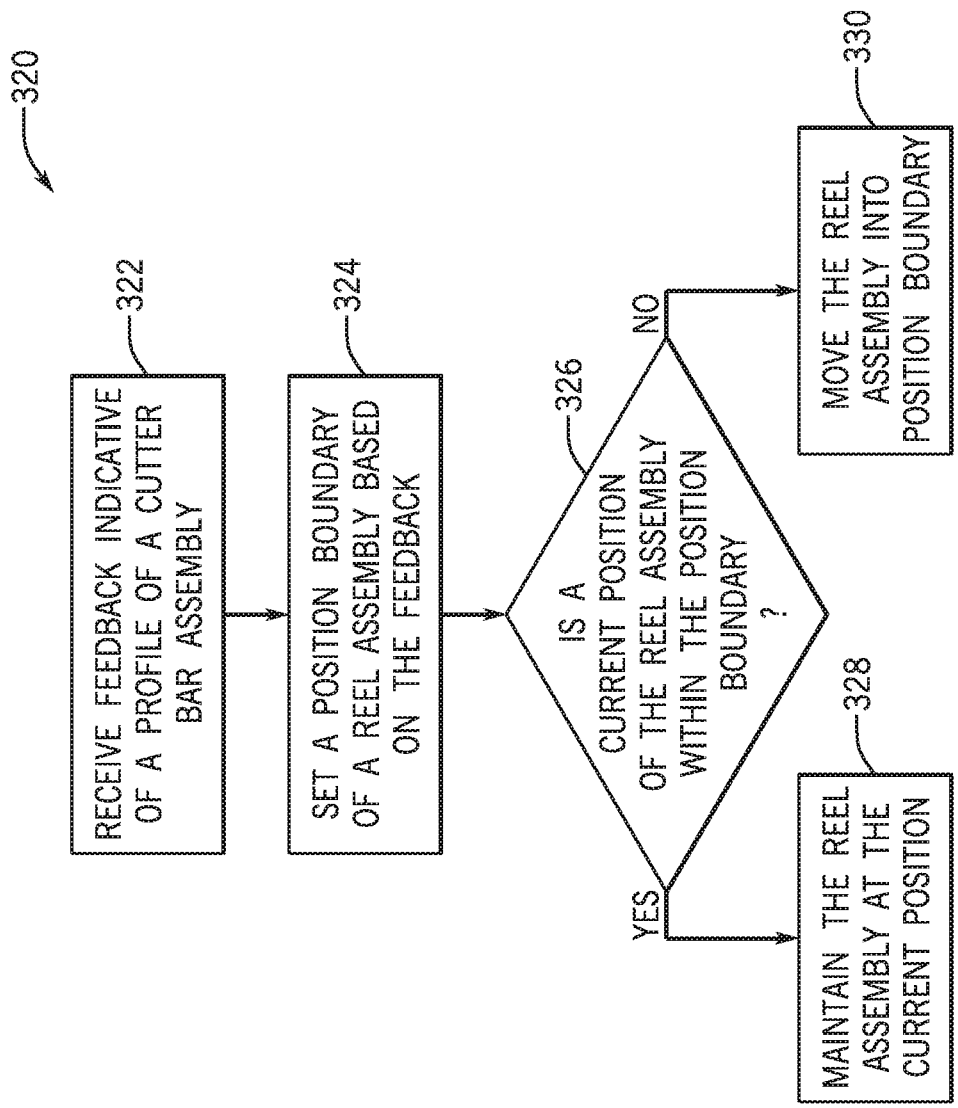
FIG. 4 is a flowchart of an embodiment of a method for setting a position boundary of a reel assembly of the header of FIG. 2, in accordance with an aspect of the present disclosure.
Figure 5:
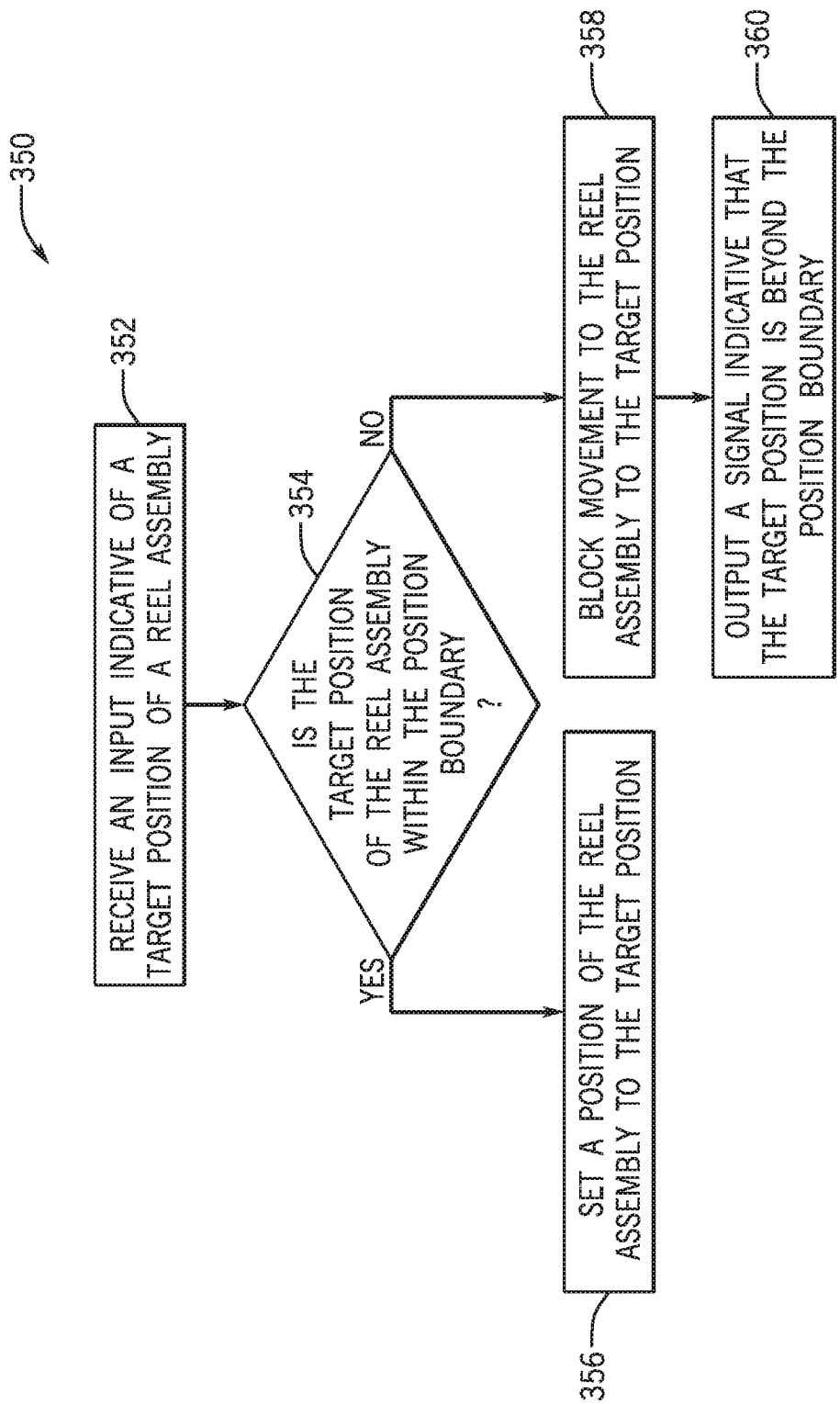
FIG. 5 is a flowchart of an embodiment of a method for moving a reel assembly of the header of FIG. 2 based on a received target position of the reel assembly, in accordance with an aspect of the present disclosure.
Figure 6:
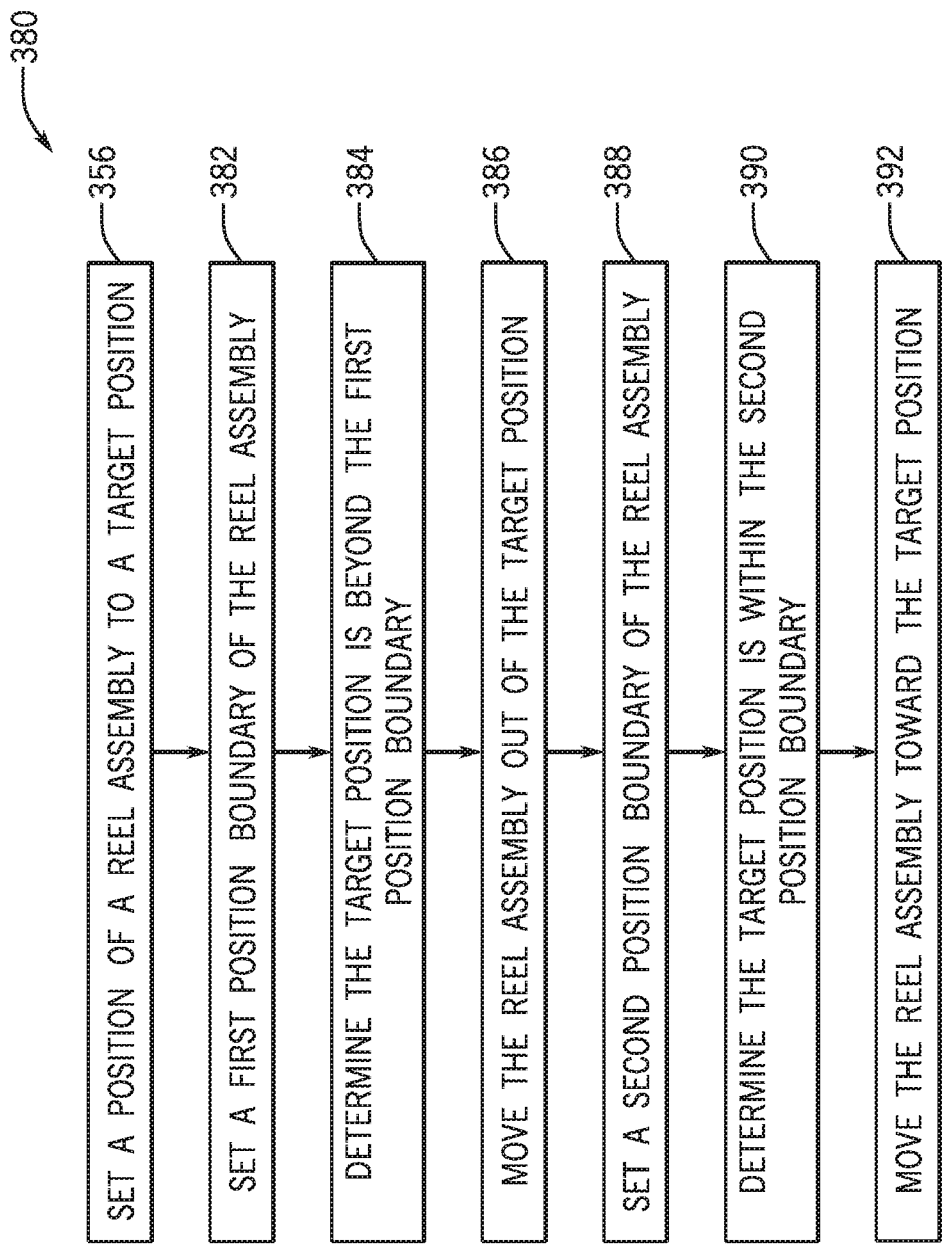
FIG. 6 is a flowchart of an embodiment of a method for setting a position of a reel assembly based on a position boundary, in accordance with an aspect of the present disclosure.

FIGS. 4-6 are each flowcharts of embodiments of various methods for operating the header. The steps of each method may be performed by a controller, such as the controller 290 of FIG. 3. As an example, each method may be performed during the operation of the agricultural system. Additionally, each method may be performed differently in different embodiments of the agricultural system. For example, additional steps of each method may be performed, and/or certain steps of each method may be removed, modified, and/or performed in a different order.

FIG. 4 is a flowchart of an embodiment of a method 320 for setting a position boundary of the reel assembly. At block 322, feedback (e.g., sensor feedback) indicative of a profile of the cutter bar assembly is received. The profile of the cutter bar assembly may include a position of various sections of the cutter bar assembly along a width of the cutter bar assembly. Such feedback may be determined and transmitted by the sensors of the agricultural system as the agricultural system travels through a field.

At block 324, the position boundary of the reel assembly may be set based on the received feedback. As an example, calculations may be performed using the feedback received over a time interval to determine the position boundary. Such calculations may include a mathematical mean, a mathematical median, a mathematical mode, a weighted calculation, another suitable calculation, and the like, performed on the received feedback over the time interval. Additionally or alternatively, a determination may be made regarding a frequency and/or a total number of times the position of the cutter bar assembly has moved beyond a position range (e.g., above a threshold position, below a threshold position, or both) based on the received feedback over the time interval. Other calculations with the received feedback may also be used to set the position boundary of the reel assembly in further embodiments. Moreover, in circumstances in which the field causes the position of the cutter bar assembly to vary along the width of the header, multiple position boundaries associated with different sections of the reel assembly may be determined (e.g., one position boundary for each section of the reel assembly). For embodiments in which the reel assembly includes multiple sections that may be moved independently of one another, each section of the reel assembly may be moved in accordance with a respective position boundary. Therefore, each section of the reel assembly may be positioned and/or moved differently relative to the frame. In embodiments in which the header incudes a single reel assembly, a single position boundary for the reel assembly may be set based on the received feedback. For example, the single position boundary may be set on a highest position of the cutter bar assembly so that the reel assembly avoids the cutter bar assembly.

In certain embodiments, the position boundary may be set based on feedback that has been continuously received starting from a certain time. For instance, such feedback may include position data of the cutter bar assembly received starting from a beginning of the current operation of the agricultural system, another time of the current operation (e.g., from a particular time associated with when the position boundary of the reel assembly was previously set), a time from a previous operation, another suitable time, or any combination thereof. Thus, the amount of received feedback may increase as feedback is continuously received, because currently received feedback is continuously added to the feedback that is being used to set the position boundary.

In additional or alternative embodiments, the position boundary may be set based on position data that has been received for a dynamic time interval (e.g., a moving time window). As used herein, the dynamic time interval includes a time window having a fixed amount or range of time and having a starting time that is continuously updated as the agricultural system is in operation. For instance, the dynamic time interval may encompass the previous ten minutes of operation. In this way, after the agricultural system has operated for more than ten minutes, position data that was received before the previous ten minutes of operation may no longer be used for setting the position boundary. As such, the total amount of position data may remain substantially the same as currently acquired position data replaces previously acquired position data. Although the example discusses a time period of ten minutes, the time period may include five minutes, twenty minutes, thirty minutes, one hour or more, or any other suitable time range of operation.

In further embodiments, the position boundary may be set based on feedback received from a fixed or static time interval (e.g., ten minutes, twenty minutes, thirty minutes, one hour or more of operation). As used herein, the fixed time interval includes a single time interval that is selected and position data from the fixed time interval is used until another fixed time interval is selected to replace the previously selected fixed time interval. The fixed time interval may or may not include currently received feedback. For instance, fixed the time interval may include a first block of time selected by the user during a first time of operation (e.g., during a first pass through a field). After selection of the first block of time, position data from the first block of time may continue to be used for setting the position boundary until a second block of time is selected at a second time of operation. Then, position data from the second block of time may be used until a third block of time is selected. Indeed, the selected block of time may change at a particular frequency (e.g., every ten minutes, twenty minutes, thirty minutes, one hour or more of operation) to change the position data used for setting the position boundary and/or upon input by the user.

The user may be able to select the particular manner in which the position boundary is set, such as by selecting whether position data is used based on a set starting time, a dynamic interval, and/or a fixed time interval. As such, the user may manually change the manner in which position data is selected for use in determining the position boundary, such as while the agricultural system is in operation, between different operations of the agricultural system, and so forth. Additionally or alternatively, the manner in which position data is selected for determining the position boundary may be automatically determined (e.g., without user input). In any case, the manner in which the position data is selected for determining the position boundary may be changed accordingly.

At block 326, after the position boundary has been set, a determination is made as to whether a current position of the reel assembly is within the position boundary. In other words, a determination is made as to whether the current position of the reel assembly is above the lower position boundary and/or below the upper position boundary. To this end, the current position of the reel assembly (e.g., as determined by the sensors) may be compared to the upper position boundary and/or to the lower position boundary accordingly.

At block 328, in response to a determination that the reel assembly is within the position boundary, the current position of the reel assembly is maintained. That is, since the current position of the reel assembly is not above the upper position boundary and/or below the lower position boundary, the reel assembly is not automatically moved away from its current position. Additionally, the user may still be able to transmit a user input to move the reel assembly (e.g., away from the current position) to any position within the position boundary.

However, in response to a determination that the reel assembly is beyond the position boundary, the current position of the reel assembly is automatically moved to be within the position boundary, as indicated at block 330. For instance, in response to the current position of the reel assembly being above the upper position boundary, the reel assembly may be automatically lowered to a position below the upper position boundary. in response to the current position of the reel assembly being below the lower position boundary, the reel assembly may be automatically raised to a position above the lower position boundary. In certain embodiments, the reel assembly may be moved to a default or preset position. In an example, in response to the reel assembly being above the upper position boundary, the reel assembly may be moved to be substantially at the upper position boundary. In another example, in response to the reel assembly being below the lower position boundary, the reel assembly may be moved to be substantially at the lower position boundary. However, in additional or alternative embodiments, the reel assembly may be moved to any other suitable position within the position boundary. In further embodiments, when a determination is made that the current position of the reel assembly is beyond the position boundary, a notification may be sent to notify the user. As such, the user is aware that the reel assembly is currently positioned beyond the position boundary and/or that the reel assembly is being moved to within the position boundary, and the user may operate the agricultural system accordingly.

After the reel assembly has been automatically moved to within the position boundary (e.g., to a determined suitable position, to a default position), the reel assembly may be manually moved by the operator. Thus, the user may then set the position of the reel assembly (e.g., away from the suitable position, away from the default position) as desired within the position of the boundary. In other words, when the position boundary updates such that the reel assembly is positioned outside of the position boundary, the reel assembly is automatically moved to within the position boundary, and after the reel assembly has been moved to within the position boundary, the reel assembly may be manually moved by the user to any other position within the position boundary.

In some circumstances, the steps of the method 320 may be iteratively performed. For instance, during the operation of the agricultural system, the position boundary may continuously or periodically be updated based on continuously received feedback, and during each update to the position boundary, a determination may be made that the position of the reel assembly is beyond the updated position boundary. Accordingly, the reel assembly may be moved multiple times as the agricultural system travels through the field in response to the multiple determinations that the reel assembly is positioned beyond the updated position boundaries in order to position the reel assembly within the updated position boundaries.

Although FIG. 4 primarily discusses setting the position boundary of the reel assembly based on a continuously changing profile of the cutter bar assembly relative to the frame, in additional or alternative embodiments, the position boundary of the reel assembly may be set based on a fixed profile of the cutter bar assembly relative to the frame. By way of example, the cutter bar assembly may be operated such that the blades do not substantially move relative to the frame of the header (e.g., in a rigid or locked mode). Moreover, the position of the cutter bar assembly relative to the frame may be set at a target cutter bar assembly position. Accordingly, the position boundary of the reel assembly may be set based on the target cutter bar assembly position. Additionally, since the cutter bar assembly does not substantially move from the target cutter bar assembly position during operation of the agricultural system, the position boundary of the reel assembly may not change during the operation of the agricultural system until the cutter bar assembly is set at a new target cutter bar assembly position. In this way, the position boundary of the reel assembly may be based on the set position of the cutter bar assembly rather than on continuously received feedback indicative of the current profile of the cutter bar assembly.

FIG. 5 is a flowchart of an embodiment of a method 350 for moving the reel assembly based on a received target position of the reel assembly. At block 352, an input indicative of the target position of the reel assembly is received. In certain embodiments, the input may be a user input transmitted by the user, such as via the user interface. In additional or alternative embodiments, the input may be received automatically, such as based on the sensor feedback.

At block 354, a determination is made as to whether the received target position is within the position boundary. For example, the received target position may be compared to the upper position boundary and/or to the lower position boundary such that a determination may be made regarding whether the received target position is above the upper position boundary and/or whether the received target position is below the lower position boundary.

At block 356, in response to a determination that the target position is within the position boundary, the reel assembly may be set to the target position. That is, since moving the reel assembly to the target position will not move the reel assembly to a position above the upper position boundary and/or below the lower position boundary, the reel assembly may be moved accordingly within the position boundary to the target position (e.g., via control signals to actuators).

However, in response to a determination that the target position is beyond the position boundary, movement of the reel assembly to the target position may be blocked, as indicated at block 358. In some embodiments, the position of the reel assembly may be substantially maintained (e.g., not moved from the current position). In additional or alternative embodiments, the reel assembly may be moved toward the target position, but movement of the reel assembly beyond the position boundary may be blocked before the reel assembly has been fully moved to the target position. For instance, if the target position is above the upper position boundary, the reel assembly may be moved up to the upper position boundary. If the target position is below the lower position boundary, the reel assembly may be moved down to the lower position boundary. In further embodiments, the reel assembly may be moved to another position in response to a determination that the target position is beyond the position boundary, such as to a position based on (e.g., between) the current position and the target position of the reel assembly.

Furthermore, in response to a determination that the target position is beyond the position boundary, a signal may be output to indicate that the target position is beyond the position boundary, as shown at block 360. The signal may include a notification that informs the user such that the user may operate the header accordingly. For instance, the notification may be sent to the user interface. In embodiments in which the target position is automatically set (e.g., based on sensor feedback), the signal may cause a new target position to be generated accordingly, and the new target position may be located within the position boundary.

FIG. 6 is a flowchart of an embodiment of a method 380 for setting the position of the reel assembly based on the position boundary. The method 380 may be performed in response to receiving the input indicative of the target position of the reel assembly (e.g., performed via the block 352 of FIG. 5). In response, at block 356, the reel assembly is set to the target position, such as after a determination is made that the target position is within a currently established position boundary.

At block 382, a first position boundary of the reel assembly is set, such as by performing the steps described with reference to block 324 of FIG. 4. Upon setting the first position boundary, a determination may be made that the current position of the reel assembly is beyond the first position boundary, as shown at block 384. The current position of the reel assembly may be substantially the same as the target position of the reel assembly set forth above. For instance, a step similar to the step described with reference to the block 354 of FIG. 5 may be performed to determine the target/current position of the reel assembly is beyond the position boundary.

As a result of determining the target/current position is beyond the first position boundary, the reel assembly may be moved out of the target/current position, as indicated at block 386. For example, the reel assembly may be moved into an updated position within the first position boundary as described with reference to block 330. As such, an updated current position of the reel assembly may be within the first position boundary.

At block 388, a second position boundary of the reel assembly may be set. The second position boundary may be different than the first position boundary set at block 382. By way of example, after receiving additional position data of the cutter bar assembly (e.g., over another time window), the second position boundary may be set accordingly. After the second position boundary is set, the target position, which was originally set at block 356, may be determined to be within the second position boundary, as shown at block 390. In other words, after updating the position boundary from the first position boundary to the second position boundary, the target position is determined to be within the currently set position boundary (e.g., the second position boundary).

At block 392, the reel assembly is moved toward the target position. In certain embodiments, upon determining that the target position is within the second position boundary, the reel assembly may be immediately moved to the target position. In additional or alternative embodiments, the reel assembly may be gradually moved toward the target position. As an example, to avoid having to move the reel assembly repeatedly (e.g., within a short time frame, based on updating the position boundary), the reel assembly may initially be moved to an intermediate position between the current position and the target position. After a certain amount of time has elapsed in which the target position remains within the position boundary, the reel assembly may be moved toward the target position again. Indeed, the reel assembly may be moved several times (e.g., incrementally) toward the target position until the reel assembly is at the target position or a determination is made that the current position and/or the target position of the reel assembly is beyond another updated position boundary, in which case the reel assembly may be moved away from the target position.

In additional or alternative embodiments, the reel assembly may also be generally moved toward the cutter bar assembly. For example, the user may set the position of the reel assembly at a target position that is within the current position boundary. However, the position boundary may continually or periodically update such that the lower position boundary may continue to move toward the cutter bar assembly. In response, the reel assembly may also be automatically moved (e.g., out of the set target position) toward the cutter bar assembly. For instance, the user may not be aware that the lower position boundary is lowering toward the cutter bar assembly and that the reel assembly may be moved to a more suitable position for harvesting the field. For this reason, the reel assembly may be automatically moved toward the cutter bar assembly or to any other suitable position within the position boundary based on the position of the cutter bar assembly. In certain embodiments, the reel assembly may be automatically moved in response to elapsing of a threshold time in which the received sensor feedback has indicated that the reel assembly may be moved toward the cutter bar assembly, in response to a particular updated position boundary (e.g., the lower position boundary has moved significantly toward the cutter bar assembly), or in response to any other suitable condition. In any case, the reel assembly may be automatically moved to improve operation of the header.

As mentioned above, the position of various portions (e.g., sections) of the cutter bar assembly may vary along the width of the cutter bar assembly. For this reason, different portions (e.g., sections) of the reel assembly may also be set at different positions relative to one another to accommodate the different positions of the various portions of the cutter bar assembly. To this end, FIGS. 7 and 8 illustrate various manners in which the position of the reel assembly may be set based on particular profiles of the cutter bar assembly.

Figure 7:
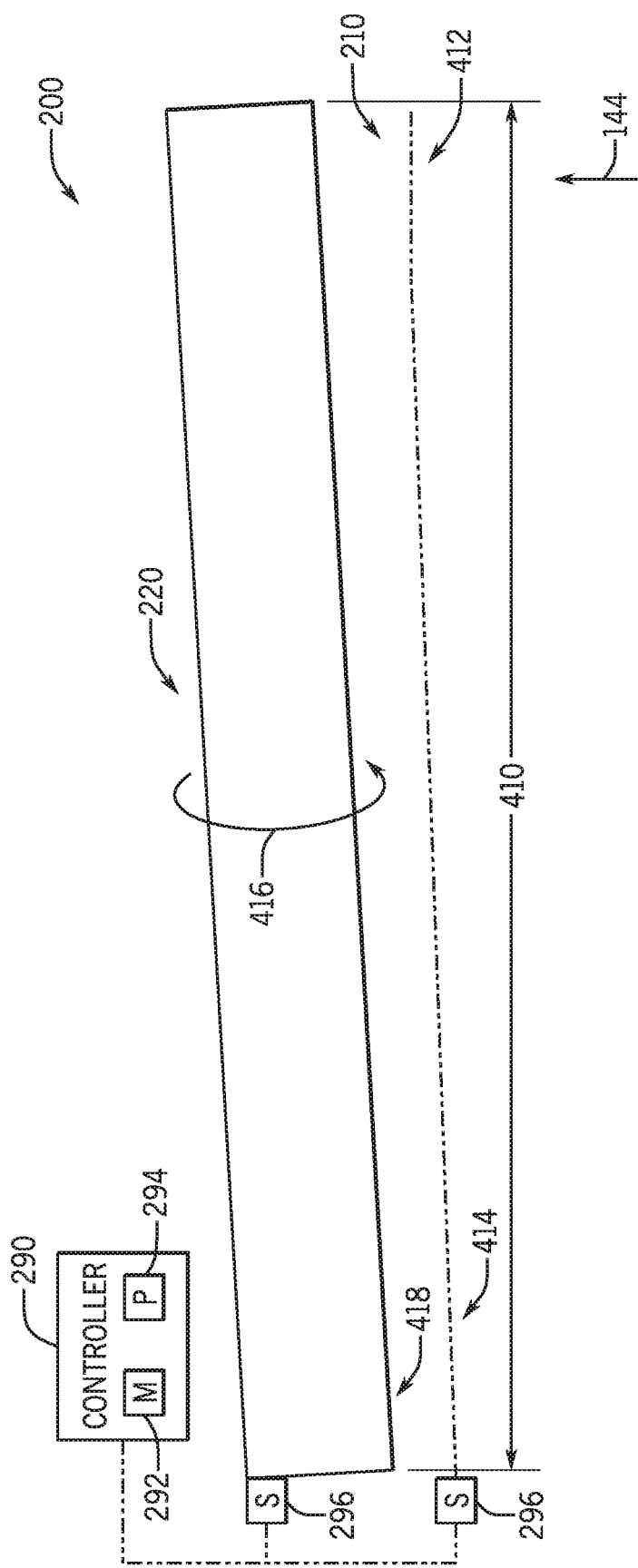
FIG. 7 is a schematic diagram of an embodiment of a header that may be employed within the agricultural system of FIG. 1, wherein the header includes a reel assembly having a single section, in accordance with an aspect of the present disclosure.

FIG. 7 is a schematic diagram of an embodiment of the header 200 that includes the cutter bar assembly 210 and the reel assembly 220 having a single section positioned above the cutter bar assembly 210. The cutter bar assembly 210 and the reel assembly 220 may each extend along a width 410 of the header 200. Additionally, in the illustrated embodiment, a first portion 412 of the cutter bar assembly 210 may be substantially straight relative to the field, and a second portion 414 of the cutter bar assembly 210 may be substantially slanted relative to the field and to the first portion 412. Based on the profile of the cutter bar assembly 210 (e.g., as determined by the sensors 296), the controller 290 may output a control signal for setting an orientation of the reel assembly 220.

By way of example, the controller 290 may determine a width of the second portion 414 relative to the width 410 of the entire header 200 and/or relative to a width of the first portion 412. In the illustrated embodiment, the second portion 414 is substantially wider (e.g., about 150 percent, 200 percent, 250 percent or more wider) than the first portion 412. Or, the first portion 412 is substantially narrower than the second portion 414 (e.g., about 70 percent, 50 percent, 25 percent or less the size of the second portion 414). As a result, the controller 290 may output a control signal to rotate the reel assembly 200 in a rotational direction 416 so as to move an end 418 of the reel assembly 200 toward the second portion 414 of the cutter bar assembly 210. In additional or alternative embodiments, the controller may output a control signal to move (e.g., translate) the entire reel assembly along the vertical axis toward the cutter bar assembly based on the profile of the cutter bar assembly. Indeed, the manner in which the reel assembly 220 is oriented relative to the cutter bar assembly 210 may be based on the particular profile of the cutter bar assembly 210. As an example, the reel assembly 220 may be moved in response to a determination that a moved region of the cutter bar assembly 210 is greater than a threshold width (e.g., greater than a threshold percentage of the width 410), that a portion of the cutter bar assembly 210 has moved greater than a threshold distance relative to the reel assembly 220, another suitable parameter associated with the profile of the cutter bar assembly 210, or any combination thereof. In further embodiments, rather than moving the reel assembly 220 toward the cutter bar assembly 210, the reel assembly 220 may be moved away from the cutter bar assembly 210 (e.g., when the cutter bar assembly 210 is moved upward along the vertical axis 144).

FIG. 8 is a schematic diagram of an embodiment of the header 200 having the cutter bar assembly 210 and the reel assembly 220 having multiple reel assembly sections (e.g., a first reel assembly section 440, a second reel assembly section 442, a third reel assembly section 444) positioned above the cutter bar assembly 210. Each reel assembly section 440, 442, 444 may be independently movable by the controller 290. That is, the controller 290 may output respective signals for instructing each reel assembly section 440, 442, 444 to be set at different positions relative to one another. For instance, the cutter bar assembly 210 may include cutter bar assembly sections (e.g., a first cutter bar assembly section 446, a second cutter bar assembly section 448, a third cutter bar assembly section 450) corresponding to the respective reel assembly sections 440, 442, 444. The controller 290 may be configured to move the respective reel assembly sections 440, 442, 444 based on the respective profiles of the cutter bar assembly sections 446, 448, 450, rather than on a profile of the entire cutter bar assembly 210.

In the illustrated embodiment, the second cutter bar assembly section 448 is substantially flat relative to the field. For this reason, the controller 290 may set the second reel assembly section 442 at a substantially flat position relative to the field and to the second cutter bar assembly section 448. Moreover, the position of the second reel assembly section 442 may be set at a distance 452 away from the second cutter bar assembly section 448 (e.g., at a target position or other position within a respective position boundary determined based on the position of the second cutter bar assembly section 448). Further, a portion of the first cutter bar assembly section 446 may be slanted downward relative to the second cutter bar assembly section 448. Based on the profile of the first cutter bar assembly section 446, the controller 290 may set the position of the first reel assembly section 440 at a substantially slanted position relative to the second reel assembly section 442. For instance, the position of the first reel assembly section 440 may be set to substantially maintain the distance 452 between portions of the first reel assembly section 440 and of the first cutter bar assembly section 446 or to otherwise position the first reel assembly section 440 within a respective position boundary determined based on the position of the first cutter bar assembly section 446. The particular position of the first reel assembly section 440 may be based on the particular profile of the first cutter bar assembly section 446 (e.g., an extent of movement of the first cutter bar assembly 446, an amount or percentage of the first cutter bar assembly section 446 that has moved). By way of example, the controller 290 may determine that a majority of the first cutter bar assembly section 446 is slanted with respect to the second cutter bar assembly section 448 and therefore, the controller 290 may determine that the first reel assembly section 440 is to be rotated. Alternatively, if the controller determines that a smaller amount of the first cutter bar assembly section is rotated and/or if the first cutter bar assembly is rotated to a smaller extent, the rotation of the first reel assembly section may be reduced.

Additionally, in the illustrated embodiment, the third cutter bar assembly section 450 includes a raised portion 454, which may be caused from a contour of the field, an obstacle on the field, or the like. However, the raised portion 454 may not include a threshold amount (e.g., width) of the third cutter bar assembly section 450, may not raise beyond a distance threshold toward the third reel assembly section 444, may not have been maintained for greater than a time threshold (e.g., the raised portion 454 is a small bump on the field), or any combination thereof. As a result, the controller 290 may determine that there is a relatively low likelihood of the raised portion 454 coming into contact with and/or adversely affecting operations the reel assembly 220 (e.g., with the third reel assembly section 444) and therefore, does not change the position of the third reel assembly section 440. In this manner, the position of the third reel assembly section 440 remains substantially level with the second reel assembly section 442, and/or a respective position boundary for the third reel assembly section 440 is not adjusted based on the raised portion 454. However, in an alternative embodiment, if the raised portion included a greater amount of the third cutter bar assembly section and/or if the raised portion was raised a greater distance toward the third reel assembly section, the controller may adjust the respective position boundary and/or may move the third reel assembly section away from the illustrated position. Indeed, while the illustrated embodiment shows rotation of the first reel assembly section 440, alternative embodiments may move any of the reel assembly sections in any suitable manner, including sliding in a vertical and/or horizontal direction in addition to or as an alternative to rotating relative to the cutter bar assembly.

FIG. 9 is a flowchart of an embodiment of a method 480 for setting a position of a particular section of the reel assembly. As described with respect to FIGS. 4-6, the method 480 may be performed via a controller, such as the controller 290 of FIG. 3. Further, the method 480 may be performed differently in additional or alternative embodiments. For instance, additional steps may be performed with respect to the method 480, and/or certain steps of the method 480 may be modified, removed, and/or performed in a different order.

At block 482, feedback, such as sensor feedback, is received. The feedback indicates a current profile of the cutter bar assembly, such as a current profile of the entire cutter bar assembly and/or a current profile of a section of the cutter bar assembly. Based on the received feedback, a determination may be made that the reel assembly is to be moved, as indicated at block 484.

In some embodiments, the feedback may indicate that the current shape of the cutter bar assembly indicates the reel assembly is to be moved. In an example, the current shape of the cutter bar assembly may indicate the reel assembly may be moved toward the cutter bar assembly without having a substantial likelihood in which the cutter bar assembly will contact the reel assembly. In another example, the current shape of the cutter bar assembly may indicate that there is a substantial likelihood in which the reel assembly will contact the cutter bar assembly and therefore, the reel assembly is to be moved away from the cutter bar assembly. In embodiments in which the reel assembly includes multiple sections, the received feedback may be used to determine whether a particular section of the reel assembly is to be moved. As an example, based on the received feedback, a determination may be made that one of the sections of the cutter bar assembly has transitioned to a current profile from a previous profile. The feedback may indicate that the current profile may be substantially maintained for a threshold time period, that the transition from the previous profile to the current profile may exceed a threshold movement, that a moved region of the section of the cutter bar assembly exceeds a threshold width of the section, and/or another suitable condition of the section of the cutter bar assembly. As such, the feedback indicates that a corresponding section of the reel assembly is to be moved, but remaining sections of the reel assembly may be maintained at their current positions. Thus, each section of the reel assembly may be separately compared to the received feedback to determine whether any of the sections of the reel assembly is to be moved.

In additional or alternative embodiments, the feedback may indicate a duration in which the profile of the cutter bar assembly has been substantially maintained. For instance, the reel assembly may have been set based on previously received feedback indicative of a previous profile of the cutter bar assembly. Currently received feedback may indicate that the current profile of the cutter bar assembly has slightly deviated from the previous profile (e.g., the deviation of the current profile does not include a threshold intensity and/or a threshold amount of the current bar assembly) such that the reel assembly is to be moved immediately. However, the current feedback may alternatively indicate that the current profile of the cutter bar assembly has been substantially maintained for greater than a threshold period of time. Accordingly, a determination may be made that the reel assembly is to be set based on the current feedback indicative of the current profile rather than on the previously received feedback indicative of the previous profile (e.g., the previously received feedback is no longer accurate). As such, the determination that the reel assembly is to be moved may be based on a duration of time in addition to or as an alternative to the profile of the cutter bar assembly.

At block 486, the position of the reel assembly is set based on the feedback. For instance, the position of the entire reel assembly may be set based on the feedback indicative of the profile (e.g., the shape and/or the duration of time associated with the profile) of the cutter bar assembly. In embodiments in which the reel assembly includes multiple sections, the position of each particular section of the reel assembly may be set based on the feedback indicative of the profile. Indeed, each section of the reel assembly may be set at a different location relative to one another based on the profile of the cutter bar assembly. It should be noted that respective position boundaries may be set to limit the movement of each section of the reel assembly in combination with the features described with respect to FIGS. 7-9. For example, each section of the reel assembly may be blocked from moving to a set position relative to the cutter bar assembly based on the portion of the profile of the cutter bar assembly associated with the particular section of the reel assembly.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C.

The invention claimed is:

1. An agricultural system, comprising:
a frame;
a cutter bar assembly configured to move relative to the frame during an operation of the agricultural system;
a reel assembly configured to guide crops to the cutter bar assembly during the operation of the agricultural system; and
a controller configured to:
receive an input indicative of a target position of the reel assembly;
receive feedback indicative of a profile of the cutter bar assembly;
set a position boundary of the reel assembly based on the feedback; and
block movement of the reel assembly to a position beyond the position boundary of the reel assembly.

2. The agricultural system of claim 1, wherein the controller is configured to:
determine whether the target position is within the position boundary of the reel assembly; and
set a position of the reel assembly to the target position in response to a determination that the target position is within the position boundary.

3. The agricultural system of claim 2, comprising an extension coupling the reel assembly to the frame and comprising an actuator configured to move the extension relative to the frame, wherein the controller is configured to set the position of the reel assembly to the target position by outputting a signal to instruct the actuator to move the extension relative to the frame.

4. The agricultural system of claim 1, wherein the controller is configured to:
determine whether the target position is within the position boundary of the reel assembly; and
block movement of the reel assembly to the target position in response to a determination that the target position is beyond the position boundary.

5. The agricultural system of claim 1, comprising a plurality of sensors, wherein the feedback indicative of the profile of the cutter bar assembly is received from the plurality of sensors, and the feedback comprises a position of the reel assembly relative to the frame, a position of the cutter bar assembly relative to the frame, a condition of a field harvested by the agricultural system, a position of a crop harvested by the agricultural system, or any combination thereof.

6. The agricultural system of claim 1, wherein the feedback comprises position data of the cutter bar assembly, and the position data is continuously received over a dynamic time interval, over a fixed time interval, from a set starting time, or any combination thereof.

7. The agricultural system of claim 1, wherein the feedback comprises position data of the cutter bar assembly received over a time interval, and the controller is configured to set the position boundary based on a calculation of the position data received over the time interval, based on a number of times that the position data indicates the cutter bar assembly has moved beyond a first position range, based on a frequency that the position data indicates the cutter bar assembly has moved beyond a second position range, or any combination thereof.

8. A non-transitory computer readable medium comprising executable instructions that, when executed by a processor, are configured to cause the processor to:

receive feedback indicative of a profile of a cutter bar assembly of an agricultural system, wherein the cutter bar assembly comprises an arm coupled to a frame, and the arm is configured to move relative to the frame during operation of the agricultural system;

set a position boundary of a reel assembly of the agricultural system based on the feedback, wherein the reel assembly is configured to guide crops to the cutter bar assembly during the operation of the agricultural system;

receive an input indicative of a target position of the reel assembly;

compare the target position with the position boundary; and block movement of the reel assembly to the target position in response to a determination that the target position is beyond the position boundary.

9. The non-transitory computer readable medium of claim 8, wherein the instructions, when executed, are configured to:

compare a first set position of the reel assembly to the position boundary in response to setting the position boundary of the reel assembly, wherein the first set position is associated with a current position of the reel assembly; and output a signal to move the reel assembly to a second set position in response to an additional determination that the first set position is beyond the position boundary, wherein the second set position is within the position boundary.

10. The non-transitory computer readable medium of claim 9, wherein the instructions, when executed, are configured to:

receive additional feedback indicative of an updated profile of the cutter bar assembly;

set an additional position boundary of the reel assembly based on the additional feedback;

compare the first set position to the additional position boundary; and output a signal to set the reel assembly to the first set position in response to a further determination that the first set position is within the additional position boundary.

11. The non-transitory computer readable medium of claim 8, wherein the instructions, when executed, are configured to output a notification in response to the determination that the target position is beyond the position boundary.

12. The non-transitory computer readable medium of claim 8, wherein the position boundary comprises a lower position boundary, and the instructions, when executed, are configured to set the position of the reel assembly to the lower position boundary in response to another determination that the target position is below the lower position boundary.

13. The non-transitory computer readable medium of claim 8, wherein the instructions, when executed, are configured to maintain a current position of the reel assembly in response the determination that the target position is beyond the position boundary of the reel assembly.

14. The non-transitory computer readable medium of claim 13, wherein the instructions, when executed, are configured to:

receive additional feedback indicative of an updated profile of the cutter bar assembly;

set an additional position boundary of the reel assembly based on the additional feedback;

compare the target position to the additional position boundary; and output a signal to move the reel assembly from the current position to the target position in response to an additional determination that the target position of the cutter bar assembly is within the additional position boundary.

15. An agricultural system, comprising:

a frame;

a cutter bar assembly configured to move relative to the frame during an operation of the agricultural system;

a reel assembly comprising a plurality of sections, wherein each section of the plurality of sections is configured to guide crops to the cutter bar assembly during the operation of the agricultural system; and a controller configured to:

receive feedback indicative of a profile of the cutter bar assembly;

set a respective position boundary for each section of the plurality of sections of the reel assembly based on the feedback;

receive an input indicative of a target position of a selected section of the plurality of sections of the reel assembly;

compare the target position to the respective position boundary for the selected section; and block movement of the selected section of the reel assembly to the target position in response to a determination that the target position of the selected section of the reel assembly is beyond the respective position boundary of the selected section of the reel assembly.

16. The agricultural system of claim 15, wherein the controller is configured to:

determine the profile is indicative that an additional section of the plurality of sections of the reel assembly is to be moved; and output a signal to move the additional section.

17. The agricultural system of claim 16, wherein the profile is indicative that a portion of the cutter bar assembly has transitioned to a current profile from a previous profile, and the portion of the cutter bar assembly is associated with the additional section of the reel assembly.

18. The agricultural system of claim 17, wherein the controller is configured to output a signal to move the additional section of the reel assembly in response to a determination that the current profile of the cutter bar assembly has been maintained for a time threshold, a moved region of the portion exceeds a threshold length, a transition from the previous profile to the current profile exceeds a threshold movement, or any combination thereof.

19. The agricultural system of claim 16, wherein the controller is configured to maintain a respective position of remaining sections of the plurality of sections based on the received feedback.

20. The agricultural system of claim 16, wherein the controller is configured to:

determine the profile is indicative that a further section of the plurality of sections of the reel assembly is to be moved based on the received feedback; and output an additional signal to move the further section, wherein the further section is moved independently from the additional section.

* * * * *